Patented July 9, 1940

2,206,883

UNITED STATES PATENT OFFICE 2,206,883

AROMATIC-ALIPHATIC ACETALS

Kurt Desamari, Leverkusen I. G. Werk, and Reinhard Hebermehl, Cologne-Deutz, Germany, assignors to I. G. Farbenindustrie Aktiengesellschaft, Frankfort-on-the-Main, Germany No Drawing. Application March 6, 1937, Serial No. 129,381. In Germany March 7, 1936

8 Claims. (Cl. 260—613)

The present invention relates to new condensation products which may be defined as acetals of hydroxyalkyl-arylethers, i. e., of compounds of the general formula aryl.X.alkyl.OH (X standing for O or S). More particularly it relates to new compositions of matter comprising said acetals and halogen containing film forming materials.

It has been found that acetals of the character described can be easily prepared by causing alkali metal salts of aromatic hydroxy compounds, such as phenolates or naphtholates to react upon acetals of halogen containing aliphatic alcohols. Another method consists in causing aldehydes to react upon hydroxyalkyl-arylethers. We have, furthermore, found that these acetals if incorporated within halogen containing film forming materials exert remarkable properties chief among which is an enormous increase of elongation.

As hydroxyalkyl-arylethers there are preferably chosen those of the benzene series such as those of phenol or cresols, though those of the naphthalene series and of higher ring systems are not excluded from our invention.

As pointed out above the new condensation products are excellent softeners for film forming materials, particularly for those containing halogen. As examples of halogen containing film forming materials there may be mentioned chlorinated rubber, polyvinylchloride, furthermore, the addition products of hydro halic acids with caoutchouc, polymeric vinyl esters of halogen containing acids such as polyvinylchloroacetate and finally after-chlorination products of polyvinylchloride or of 2-chlorobutadiene-1.3-polymerisates. In connection with these film forming materials advantageously such softeners of the character described are employed as are liquid at ordinary temperature, either as such or in admixture one with another. The outstanding effect induced in the said film forming materials by the incorporation of these softeners results in a considerable increase of elongation. The said softeners are, furthermore, capable of effecting an increase of the brightness and of the adhesive capacity of the film forming materials to the base. The new softeners can, of course, be combined with other softeners or other additions, such as filling agents, pigments, resins and drying or non-drying oils.

The characteristic softening effect of the compounds in question is illustrated by the following tests:

Iron sheets are provided with a threefold varnish layer of the following composition

| | Parts by weight |
|---|---|
| Chlorinated rubber | 30 |
| Softener | 12 |
| Titanium dioxide | 21 |
| Xylene | 70 |

On drying, the sheets are allowed to age by a 90 hours' exposure to heat in a drying oven. The following table shows the behaviour of the varnish layer on bending the sheet iron over a bar the presence or absence in the coating of cracks at a given diameter of curve being taken as an indication of the elasticity:

| Softener | Diameter of the bar | Behaviour of the varnish layer |
|---|---|---|
| | Mm | |
| Chlorinated diphenyl (chlorine content 57%) | 25–30 | Many cracks. |
| Phthalic acid dibutyl ester | 10 | Few deep cracks. |
| Tricresyl phosphate | 25 | Many cracks. |
| Diphenoxydiethyl-ether | 8 | Do. |
| Formaldehyde acetal of phenoxyethanol | 3 | No cracks. |
| Formaldehyde acetal of a mixture of equal parts of o-, m- and p-cresoxyethanol | 3 | Do. |
| Formaldehyde acetal of β-hydroxyethyl-p-tolyl-sulfide | 3 | Do. |
| Acetaldehyde acetal of phenoxyethanol | 3 | Do. |

The above table shows that the new softeners are far superior to the hitherto known softeners such as chlorinated diphenyl and phthalic acid esters and also to the diaryldiethylethers which are closely related thereto from the chemical point of view.

The following examples illustrate the invention without restricting it thereto, the parts being by weight:

Example 1

An iron plate which has been well freed from rust is provided with a varnish-layer of the following composition:

| | Parts |
|---|---|
| Chlorinated rubber (65% chlorine content) | 12 |
| Formaldehyde acetal of cresoxyethanol | 3 |
| Chlorinated diphenyl (57% chlorine content) | 1.8 |
| Red lead | 60 |
| A mixture of toluene-xylene (1:1) | 23.2 |

On drying, there is applied twice a lacquer of the following composition:

| | Parts |
|---|---|
| Chlorinated rubber (chlorine content 64%) | 25 |
| Formaldehyde acetal of phenoxyethanol | 8 | are dissolved in 52 parts of xylene or a mixture of toluene-xylene (1:2) and intimately mixed with 15 parts of iron oxide or titanium dioxide.

A very adhesive, elastic, stable protecting layer is thus obtained.

Instead of chlorinated rubber there can be employed the products of the afterchlorination of polymerized 2-chloro- or bromo-butadiene-1,3 of a chlorine content of 65%.

Example 2

Iron materials such as pipes, profiles, etc., which are free from rust are provided with two or three coats of the following varnish:

| | Parts |
|---|---|
| Afterchlorinated polyvinyl chloride (64% chlorine) | 16 |
| Formaldehyde acetal of the phenoxyethanol | 2 |
| Formaldehyde acetal of the β-hydroxyethyl-p-tolylsulfide | 1 |
| Acetaldehydeacetal of the phenoxyethanol | 2 |
| Red ferric oxide | 10 |
| Ethyl acetate | 18 |
| Butyl acetate | 17 |
| Xylene | 34 |

A well adherent, elastic coating is obtained which is stable against chemical influence.

Example 3

An elastic varnish of good adhesive properties which is stable against mineral oil is obtained when coating a sheet iron thrice with the following batch:

| | Parts |
|---|---|
| Polyvinylchloro-acetate | 12 |
| Formaldehyde acetal of phenoxyethanol | 0.8 |
| Tricresylphosphate | 0.2 |
| Titanium dioxide | 6 |
| Benzene | 17 |
| Methanol | 10 |
| Methyl acetate | 30 |
| Butyl acetate | 24 |

Example 4

The varnish of the following composition is suited to protect iron articles towards chemical influence:

| | Parts |
|---|---|
| Polyvinylchloride (56% chlorine) | 10 |
| Formaldehyde acetal of phenoxyethanol | 3 |
| Red ferric oxide | 5 |
| Xylene | 27 |
| Butyl acetate | 27 |
| Cyclohexanone | 28 |

Example 5

A pine board is provided with two or three coats of the following varnish:

| | Parts |
|---|---|
| Chlorinated rubber (62% chlorine) | 20 |
| Linseed oil (containing 1% of cobalt-naphthenate) | 12 |
| Formaldehyde acetal of phenoxyethanol | 4 |
| Red ferric oxide | 15 |
| Toluene | 19 |
| Xylene | 30 |

An elastic protecting layer is thus obtained which is weather-resistant.

In the following there are given some examples for the preparation of the acetals of hydroxyalkyl-arylethers made use of in the foregoing examples. In practice these acetals are prepared by heating the sodium salt of the aromatic hydroxy compound with an acetal of a halogen containing aliphatic alcohol in the absence of any diluent. The resulting condensation product is isolated by distillation in vacuo.

Example I 465 parts of sodium phenolate and 346 parts of formaldehyde - di(β - chloroethyl) - acetal are stirred at 180° C. for 4 hours.

The reaction mixture is stirred with 2000 parts of water and then distilled in vacuo. The formaldehyde - di(β - phenoxethyl) - acetal thus obtained is a colorless oil which boils at 195–196° C. under 0.6 mm. pressure. It solidifies at 18° C.

Example II 332 parts of acetaldehyde-di(β-chloroethyl)-acetal are stirred at 200° C. with 412 parts of sodium phenolate for 5 hours. Thereupon the reaction mixture is stirred with 2000 parts of water while the oil is separated and distilled off. The acetaldehyde-di(β-phenoxethyl)-acetal boils at 188–190° C. under 0.6 mm. pressure.

Example III 432 parts of o-cresol and 432 parts of a 37% soda lye are evaporated to dryness in vacuo. The dry residue is heated with 380 parts of formaldehyde-di(β-chloroethyl)-acetal at 170–205° C. for 5 hours. By stirring with 2000 parts of water the precipitated sodium chloride is dissolved; hereafter the oil is separated from water and distilled in vacuo. The formaldehyde - di(β - o - cresoxethyl)-acetal is a colorless oil which boils at 190° C. under 4 mm. pressure. It solidifies at 22° C.

Example IV 504 parts of p-thiocresol and 435 parts of soda lye of 37% are evaporated to dryness. The residue is heated with 346 parts of formaldehyde-di(β-chloroethyl)-acetal at 180–190° C. for 5 hours. After the reaction mixture has been stirred with 2000 parts of water the oil is separated and distilled. The formaldehyde - di(β - thiocresoxyethyl) acetal boils at 220–221° C. under 0.6 mm. pressure. It solidifies at 37.5° C.

We claim:

1. Acetals of compounds of the formula aryl-X-alkyl-OH wherein X stands for a member of the group consisting of O and S.
2. The products as claimed in claim 1, wherein the aryl is of the benzene series.
3. Formaldehyde acetals of compounds of the formula aryl-X-alkyl-OH wherein X stands for a member of the group consisting of O and S.
4. The products as claimed in claim 3 wherein the aryl is of the benzene series.
5. Acetals of phenoxyethanol.
6. The formaldehyde acetal of phenoxyethanol.
7. Acetals of cresoxyethanol.
8. The formaldehyde acetal of cresoxyethanol.

KURT DESAMARI.
REINHARD HEBERMEHL.